United States Patent [19]

Kamuro et al.

[11] 4,427,480

[45] Jan. 24, 1984

[54] METHOD AND APPARATUS FOR PROVIDING THE INNER SURFACE OF A PIPE LINE WITH A TUBULAR LINING MATERIAL

[75] Inventors: Takashi Kamuro, Kawasaki; Hisao Ohtsuga, Yokohama; Hiroshi Kimura; Takeshi Nakamura, both of Settsu, all of Japan

[73] Assignees: Tokyo Gas Co. Ltd., Tokyo; Ashimori Industry Co., Ltd., Osaka, both of Japan

[21] Appl. No.: 504,857

[22] Filed: Jun. 20, 1983

Related U.S. Application Data

[63] Continuation of Ser. No. 294,070, Aug. 18, 1981, abandoned.

[30] Foreign Application Priority Data

Aug. 19, 1980 [JP]   Japan .................................. 55-114349

[51] Int. Cl.$^3$ .............................................. B29C 17/07
[52] U.S. Cl. ...................................... 156/287; 34/242; 156/294; 156/423; 156/497; 156/543; 156/574; 264/516; 425/387.1
[58] Field of Search ............... 156/199, 287, 294, 423, 156/286, 497, 543, 574; 34/242; 414/217, 292; 198/950; 425/387.1, 11; 264/516

[56] References Cited

U.S. PATENT DOCUMENTS

| | | | |
|---|---|---|---|
| 2,551,981 | 5/1951 | Thompson | 198/950 |
| 3,083,556 | 4/1963 | Leonard | 34/242 |
| 3,410,000 | 11/1968 | Freeman | 34/242 |
| 3,867,768 | 2/1975 | Jamin | 34/242 |
| 4,043,157 | 8/1977 | Schiffer | 34/242 |
| 4,385,885 | 5/1983 | Wood | 156/287 |

FOREIGN PATENT DOCUMENTS

| | | | |
|---|---|---|---|
| 567891 | 12/1958 | Canada | 34/242 |
| 2952625 | 7/1980 | Fed. Rep. of Germany | 156/294 |
| 55-39362 | 3/1980 | Japan | 156/294 |
| 55-41263 | 3/1980 | Japan | 156/294 |
| 2042673 | 9/1980 | United Kingdom | 156/294 |

Primary Examiner—Jerome W. Massie
Attorney, Agent, or Firm—Birch, Stewart, Kolasch & Birch

[57] ABSTRACT

A method and apparatus for providing the inner surface of a pipe line with a tubular lining material through a binder under fluid pressure which comprises introducing the lining material in flattened state containing a binder in the interior space thereof into a pressure container, annularly fixing the front end of the tubular lining material to the container and applying fluid pressure to the pressure container to push the lining material forward within the pipe line while effecting evagination of the lining material and at the same time bonding the evaginated lining material onto the inner surface of the pipe line, characterized in that the introduction of the lining material into the pressure container is performed by squeezing the flattened tubular lining material at definite intervals linearly in the transverse direction to the advancing tubular lining material under atmospheric pressure to isolate the portion of the lining material together with the binder contained therein between the adjacent two linearly squeezed positions, allowing the lining material to advance into the pressure container while keeping the lining material squeezed linearly in the transverse direction at definite intervals, and releasing the lining material from squeezing in the pressure container under fluid pressure. The use of a specific sealing device allows for the conveyance of a sufficient amount of the binder into the pressure container without being pushed back so that bonding of the evaginated lining material onto the inner surface of the pipe line can be effected satisfactorily.

17 Claims, 10 Drawing Figures

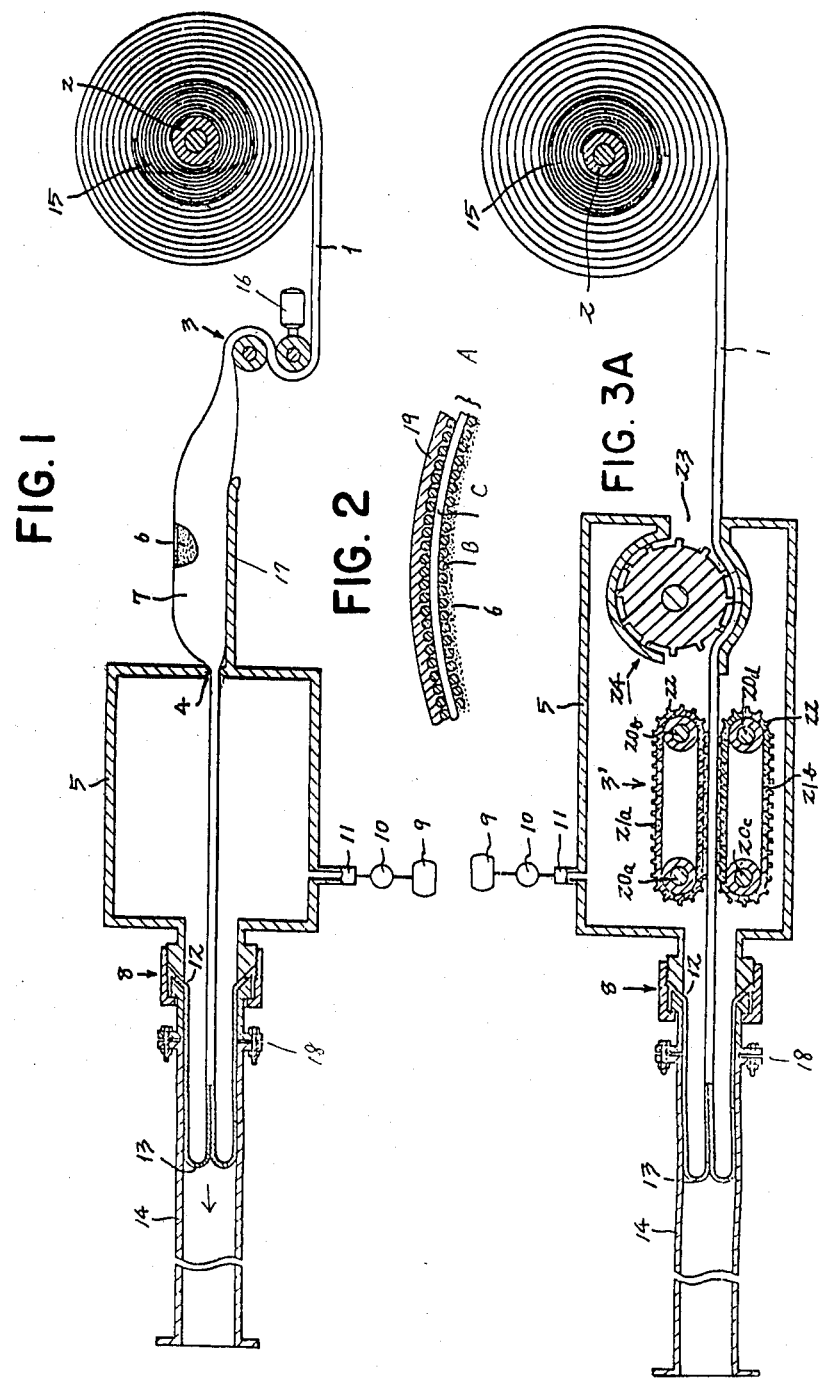

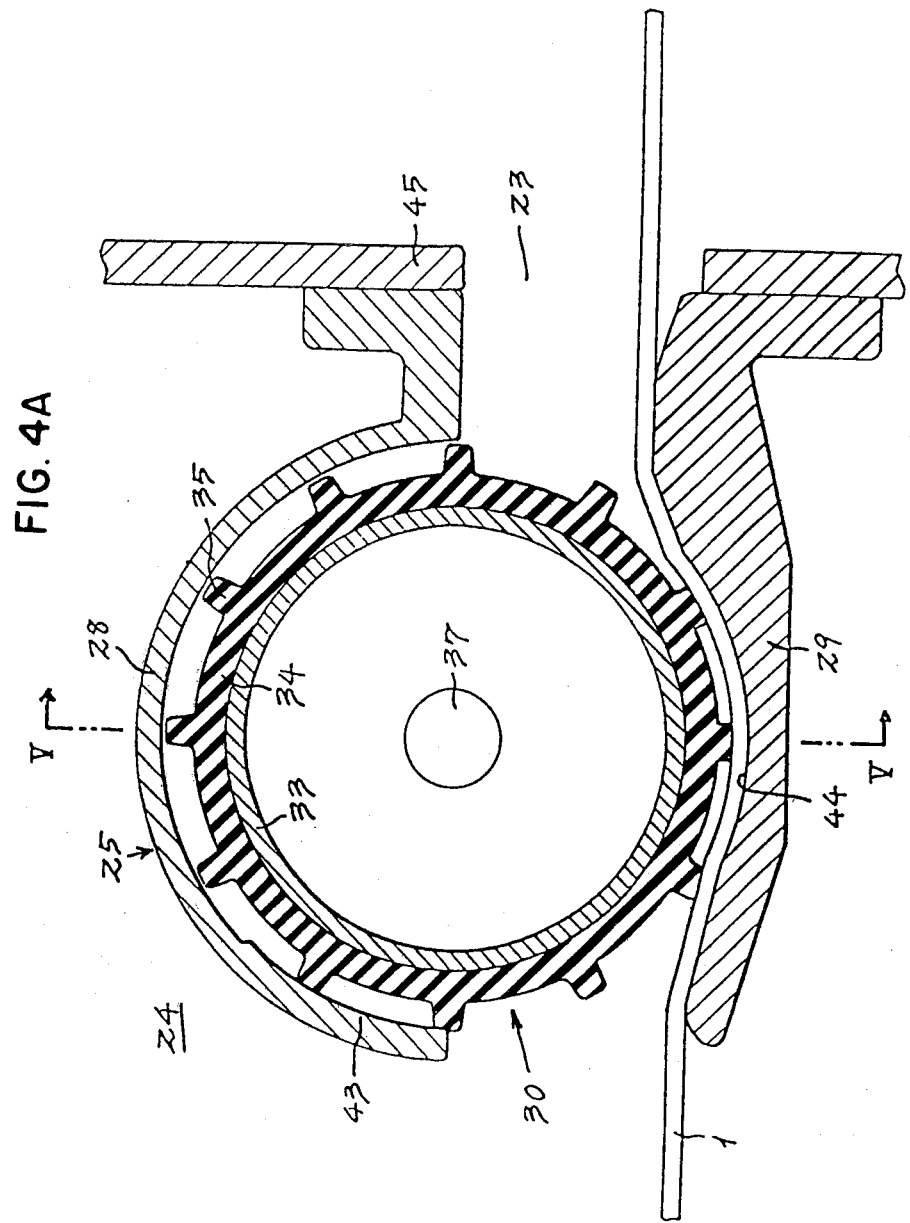

METHOD AND APPARATUS FOR PROVIDING THE INNER SURFACE OF A PIPE LINE WITH A TUBULAR LINING MATERIAL

This application is a continuation of application Ser. No. 294,070 filed Aug. 18, 1981, now abandoned.

BACKGROUND OF THE INVENTION

1. Field of the Invention

The present invention relates to a method and an apparatus for providing the inner surface of pipe lines such as those made of steel or the like metal, concrete or porcelain pipes or rigid resinous pipes, with a flexible tubular lining material through a binder under pressure. More particularly, the present invention relates to a method and an apparatus for providing the inner surface of pipe lines, chiefly those already constructed for various purposes on or under the ground, for example, underground pipe lines such as gas conduits, city water pipes and pipes enclosing power transmission wires or telephone cables, with a flexible lining material to reinforce the pipe lines or to repair damaged portions thereof.

2. Description of the Prior Art

It is well known that when underground pipe lines for gas or water are superannuated or damaged, gas or water leaks out causing many problems and that deteriorated pipe lines or casings enclosing power transmission wires or telephone cables result in accidents caused by electric leakage or crosstalk. A countermeasure from the past to prevent these problems is that when such underground pipe lines are superannuated, the pipe lines are dug up over the length of several ten to several hundred meters and replaced with new ones. In this case, however, supply of city water or gas has to be discontinued for a long period of time until the pipe replacing works have been finished. In the case where superannuated pipes are buried under public roads, the public encounters much trouble and inconvenience since traffic on the roads is limited during the work for digging up such superannuated pipes and replacing them with new ones. Further, much labor and cost are required for renewing the pipes in addition to difficulty in the work itself for pipe exchange. Once more, it is not unusual that many of the known methods for renewing the deteriorated or damaged pipes cannot be utilized, due to the particular situations of the place where such pipes are buried. In recent years, a strong probability of a big earthquake has been reported in many places in the world with the development of earthquake-predicting technique and a consideration is being given to reinforcing underground pipes, regardless of whether such pipes are superannuated or not, to protect them from damage anticipated possible by earthquakes.

A method for lining pipes, especially those buried in the ground without the necessity of digging up the buried pipes wherein a flexible tube is inserted into underground pipes and bonded to the inner surface thereof with the aid of a binder is already proposed for attaining both purposes of repairing damaged portions of the pipes and reinforcing the pipes so as to withstand strong mechanical shock as produced by an earthquake. In such a method, however, the step for inserting the flexible tube into the underground pipes is extremely difficult so that the work is almost impossible to operate in such places where the pipes are long or are curved in several portions. Developed recently under such circumstances is a method for providing pipes with a lining simultaneously with evagination wherein a flexible tube is inserted into a pipe while truning the tube inside out by the action of a pressurized fluid such as compressed air and bonded at the same time onto the inner surface of the pipe by the aid of a binder. The method of this type is disclosed in U.S. Pat. Nos. 2,794,758 and 3,132,062 and Japanese Patent Unexamined Publn. No. Sho. 55-39362. In these methods, a flexible tubular lining material is placed in a pressure tank and inserted into pipe lines simultaneously with evagination under pressure. These methods are certainly advantageous in that insertion of a lining material into a pipe is easy and requires only a short period of time; the lining material is easily applied onto the inner surface of the pipe; and the treatment is applicable to pipes of larger or smaller diameters. However, these methods are not practical for lining a pipe line of 200 m or more in length because the pressure container becomes too big for accommodating the bulky lining material.

A lining method to enable lining of a very long pipe line was successively developed wherein a long lining material is placed outside the pressure container and continuously fed thereinto. This improved method need not use a big pressure container and is classified into two types; one using a lining material previously provided on its inner surface with a binder and the other applying a binder onto the inner surface of a lining material simultaneously with or just before evagination of the lining material. The former type method is disclosed in U.S. Pat. No. 4,064,211 and U.K. Pat. No. 1,069,623 while the latter type method in U.S. Pat. No. 4,182,262; U.K. Pat. No. 1,044,645 and Japanese Patent Unexamined Publn. No. Sho. 55-90326. However, both types of these improved methods still have drawbacks, particularly in that when a lining material is introduced into the pressure container, a binder applied previously or just before introduction into the container onto the inner surface of the lining material is pushed backward by the internal fluid pressure to disturb even application of the binder onto the inner surface of the lining material, thus resulting in a great obstacle to assure bonding of the lining material to the pipe line.

As far as the method itself for satisfactorily applying a binder is concerned, several prior art methods come into question. U.S. Pat. No. 3,230,129 discloses a method for lining conduits wherein a conduit is previously filled with a binder and a resinous tube is inserted into the conduit from one end thereof while turning the tube inside out and pushing the binder forward thereby bonding the evaginated portion of the tube onto the inner surface of the conduit by the aid of the binder remaining on the inner surface thereof. However, this method has also a number of drawbacks. Firstly, the quantity and distribution of the binder cannot be controlled at all and a significant amount of the binder is wasted. Secondly, an extremely high pressure is required fo evaginating the tube while pushing the binder forward. Thirdly, when the pipe is inclined or curved vertically, the head pressure of the binder makes it difficult to evaginate the tube or fluctuates the fluid pressure for evagination so that the amount of the binder interposed between the conduit and the tube tends to vary.

U.K. Pat. No. 1,512,035 discloses a method for lining pipe lines wherein a binder is applied onto the inner surface of a pipe line from a rotary spraying unit moving along the inside of the pipe line and positioned just in front of the lining tube moving forward simultaneously with evagination. This method is advantageous in control of the amount of the binder used but has a drawback that this method wherein the spraying unit moves along the inside of the pipe line cannot be applied to pipe lines curved in several portions because the movement of the spraying unit becomes almost impossible or unstable in curved portions.

U.S. Pat. No. 4,135,958 discloses a method of lining passageways with a tube wherein a binder container moves along the inside of a passageway while supplying a binder to a reservoir formed in the uneverted portion of the tube also moving under eversion along the inside of the passageway in the same direction to the moving container. As the binder container used in this method is similar to the spraying unit used in the method of U.K. Pat. No. 1,512,035 just above mentioned, this method has the same drawback as in the method of the U.K. patent.

Japanese Patent Unexamined Publn. Nos. Sho. 55-91629 and 56-44621 disclose a method for lining pipe lines which is basically an improvement relating to the methods disclosed in U.S. Pat. No. 4,182,262; U.K. Pat. No. 1,044,645 and Japanese Patent Unexamined Publn. No. Sho. 55-90326. According to this improved method, a binder reservoir is formed in the interior space of a lining material in rear of the pressure container and a long pipe line with many curved portions can be lined. However, this method has the same drawbacks as those seen, for example, in U.K. Pat. No. 1,044,645 and Japanese Patent Unexamined Publn. No. Sho. 55-90326; a binder applied just before introduction of the pressure container onto the inner surface of a lining material is pushed backward by the internal fluid pressure when the lining material is introduced into the container. Further, this method is applicable only to the case of applying a binder onto the inner surface of the lining material just before its introduction into the pressure container and has to use an apparatus somewhat complex in structure when the length of the lining material is great.

Although the last mentioned type methods are fundamentally excellent in the lining treatment itself of a very long pipe line having curved portions, these methods are still unsatisfactory in respect of applying a sufficient amount of the binder evenly onto the inner surface of the lining material. Under these circumstances, there is a great demand for development of a new method which entirely overcomes the drawbacks of the prior art methods.

BRIEF SUMMARY OF THE INVENTION

Accordingly, it is an object of the present invention to provide a method for smoothly providing the inner surface of a pipe line, even if it has a length as long as 100 meters or more and/or curved portions, entirely with a flexible tubular lining material.

It is another object of the present invention to provide a method for applying a sufficient amount of a binder evenly onto the inner surface of a tubular lining material without any loss of the binder irrespective of whether the binder has previously been enclosed in the lining material or is applied to the lining material just before its introduction into a pressure container.

It is still another object of the present invention to provide a method for controlling supply of the binder without being pushed backward by fluid pressure to adjust the amount of the binder applied to the lining material.

It is further object of the present invention to provide an apparatus suitable for attaining the aforesaid objects.

It is still further object of the present invention to provide an apparatus which is simple and relatively small in size for attaining the aforesaid objects.

Other objects, features and advantages of the present invention will become apparent more fully from the following description.

BRIEF DESCRIPTION OF THE DRAWINGS

The present invention can more fully be understood from the following description taken in conjunction with the accompanying drawings in which:

FIG. 1 is a schematic side view showing a typical example of the prior art apparatus.

FIG. 2 is an enlarged partial section view of a flexible tubular lining material provided on its inner surface thereof with a binder.

FIG. 3A is a schematic side view showing an example of the apparatus of this invention wherein a tubular lining material having a binder enclosed therein is used.

FIG. 4A is a schematic side view of an example of the sealing device of this invention.

DETAILED DESCRIPTION OF THE INVENTION

Figure 3B:
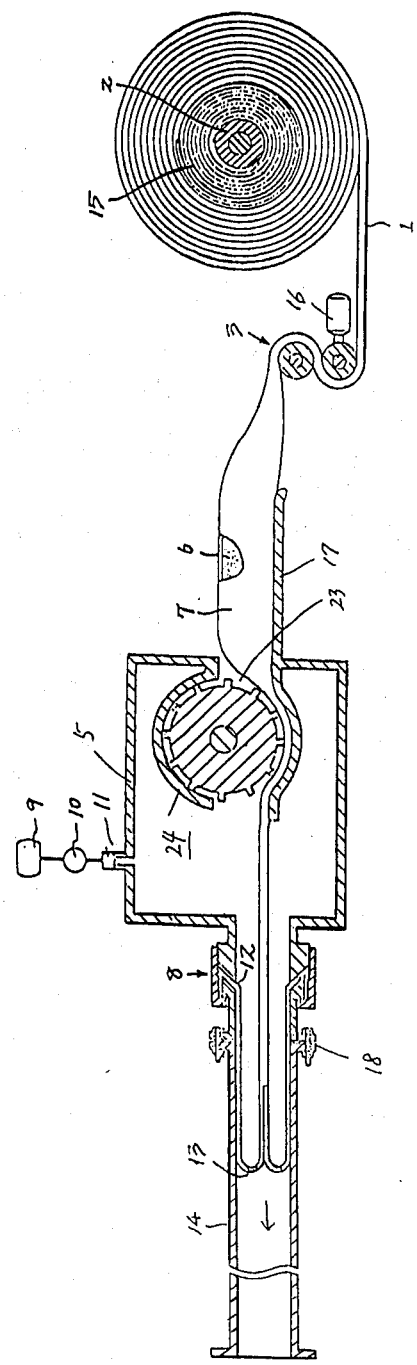
FIG. 3B is a schematic side view showing another example of the apparatus of this invention wherein the pressure container of the prior art apparatus shown in FIG. 1 is equipped with a specific sealing device of this invention.

It has now been found surprisingly that the disadvantages of the prior art methods for providing pipe lines, especially those having a length as long as 100 meters or more and/or many curved portions, with a lining can satisfactorily be overcome by a method wherein the pressure container for moving and evaginating the lining material by the internal fluid pressure is provided at the rear end thereof with a specific sealing device which is simple in structure and capable of sealing the pressure container to prevent leakage of the pressurized fluid therefrom while squeezing, in at least two positions, the unevaginated portion of the lining material enclosing a binder in the interior space thereof with at least two projections arranged at intervals on the outer surface of a rotary drum of the device, each being shaped so as to form a protuberant linear tooth extending in the direction transverse to the longitudinally running lining material and to push it forward in accordance with the rotary movement of the drum whereby the running velocity of the lining material and the amount of the binder applied thereto are adjusted suitably and the binder is prevented from being pushed backward by the internal fluid pressure. Accordingly, the present invention has been accomplished on the basis of the above finding and is characterized by the use of the specific sealing device in combination with the pressure container.

Referring to FIG. 1 showing a typical prior art apparatus, a flexible tubular lining material 1 is connected at one free end to a rope-like elongated element 15 and wound on a reel 2 in such manner that the rope-like elongated element 15 comes first. The lining material 1 is reeled off, passed through a driving unit 3 and a slit 4 and introduced into a pressure container 5 which is provided with an inlet 11 for a pressurized fluid sent from a compressor 9 through a valve 10. The lining material 1 is enclosed in rear of the pressure container 5 with a sufficient amount of a binder 6 to form a reservoir 7 of the binder. The binder 6 is conveyed with the forward movement of the lining material 1 and squeezed at the slit 4 so that only a part of the binder is evenly applied onto the inner surface of the lining material. The front end of the lining material is annularly fixed to a mouth piece 8 formed at the front end of the pressure container 5. The driving unit 3 consists of a pair of rolls and is driven by a motor 16 to control the feeding speed of the lining material 1 in a flattened state which may be conveyed at an irregular speed according to the fluid pressure. A shelf 17 extends horizontally from the rear wall of the pressure container 5 to support the resin reservoir 7 formed within the lining material 1. The front end of the pressure container 5 is connected to a pipe line 14 through a flange joint 18. When a pressurized fluid such as compressed air is introduced from the compressor 9 into the pressure container 5 through the inlet 11, the fluid pressure acts on the unevaginated portion in rear of the fixed portion 12 of the lining material 1 to form a turning point 13 where the lining material in a flattened state is turned inside out. The lining material is then pushed forward within the pipe line 14 as shown by an arrow in FIG. 1 by the internal fluid pressure acting on the turning point 13, whereby the turning point advances correspondingly. In such manner, the lining material 1 gradually drawn from the reel 2 and conveyed through the driving unit 3, the internally formed resin reservoir 7, the slit 4, the pressure container 5 and the pipe line 14 to the turning point where the lining material is turned inside out so that the resin-applied inner surface of the lining material is exposed outside and attached onto the inner surface of the pipe line 14 through the binder 6 to form a lining. At the final stage of the lining treatment, the lining material 1 has been evaginated over its full length from one end of the pipe line 14 to the other end and bonded onto the inner surface of the pipe line through the binder 6. When the lining material 1 has been drawn from the reel 2, the rope-like elongated element 15 having a length at least equal to that of the lining material and connected to the rear free end thereof is successively drawn from the reel 2 and passed through the driving unit 3 whereby the advancing and evaginating velocity of the lining material is controlled.

The method using the apparatus shown in FIG. 1 is basically advantageous for lining a pipe line having length as long as 100 meters or more and/or many curved portions. Actually, however, the lining material enclosed with a binder is subjected to external fluid pressure in the pressure container 5 whereby a strong force is exerted in such manner that a part of the binder applied onto the inner surface of the lining material is pushed backward to the resin reservoir through the slit 4. Thus, the lining material passed through the slit 4 often involves portions where the binder applied onto the inner surface of the lining material is locally uneven, thus resulting in unsatisfactory bonding of the lining material onto the inner surface of the pipe line. Some prior art methods succeed in overcoming these disadvantages but the apparatuses used therein are too big or complicated to be practical. In addition, the prior art methods using the apparatus as shown in FIG. 1 where a resin reservoir is formed in rear of the pressure container exhibit such drawbacks that even when only a part of the binder in the reservoir starts curing, the heat of reaction evolved on curing is accumulated and all the binder in the reservoir may suddenly be cured at a certain stage.

The present invention is distinguished by supplying the binder existing in the lining material efficiently to the pressure container 5 so that the lining material may be bonded simultaneously with evagination firmly onto the inner surface of the pipe line through a sufficient amount of the binder.

To achieve strong bonding between the lining material and the inner surface of the pipe line, the evaginated lining material must carry a sufficient amount of the binder evenly on the surface thereof.

In FIG. 2, the lining material 1 is a type usually employed as a hose. This lining material comprises a textile jacket A made of warps B and wefts C woven or knitted in a tubular form coated on the outer surface thereof with an air-tight layer 19 of rubber or a flexible plastic material and on the inner surface thereof with a binder 6. In this case, the thickness of the binder 6 applied onto the inner surface of the lining material must be even and sufficient to attain strong cohesion of the lining material to the pipe line. The binder once applied onto the inner surface of the tubular textile jacket penetrates into the interstices and fibrous tissue of the textile jacket A to give an integrally combined FRP structure after complete curing. In case of using the apparatus shown in FIG. 1, however, the binder once applied onto the inner surface of the tubular textile jacket in the resin reservoir 7 is pushed backward through the slit 4 when introduced into the pressure container 5 and exposed under strong fluid pressure. In the extreme case, almost all of the binder applied is pushed backward to the resin reservoir 7, retaining only a very small amount of the binder absorbed in the fibrous tissue of the textile jacket A. The use of the lining material carrying a locally insufficient amount of the binder apparently causes local detaching of the lining material from the inner surface of the pipe line or the formation of wrinkles in curved portions of the pipe line, whereby the flow path becomes narrower in such detached or wrinkled portions. In the lining treatment of this type, therefore, it is necessary to apply a sufficient amount of the binder evenly onto the whole inner surface of the lining material. As the tubular textile jacket itself has been treated on the outer surface thereof with a air-tight or water-proof flexible rubber or plastic coating to form an integrally combined layer, the inner surface of the pipe line can be protected or reinforced, after completion of the lining, with a textile jacket having such air-tight or water-proof coat as the outermost layer. The present invention provides a method and an apparatus for applying a sufficient amount of a binder evenly onto the inner surface of the lining material without any fluctuation in amount of the binder over full length of the lining material.

In FIG. 3A showing an example of the apparatus of this invention, a binder has previously been applied onto the inner surface of a tubular textile jacket as lining material 1 which is connected at its rear open end to a rope-like elongated element 15 having a length at least equal to that of the lining material. The lining material 1 and the rope-like elongated element 15 are wound in the same manner as described with respect to FIG. 1, on a reel 2. Inside a pressure container 5, a driving unit 3' is situated which adjusts the advancing velocity of the lining material 1 and comprises two pairs of pulleys 20a, 20b, 20c and 20d, a pair of the facing caterpillar belts 21a and 21b and a number of laterally extending protuberances 22 formed on each caterpillar belt in such manner that they are faced to each other. The caterpillar belts are driven externally at the same velocity by pulleys to convey the lining material at a given velocity. The pressure container 5 is provided at the front end thereof with a mouth piece 8 which fixes the front open end of the lining material annularly. The drum of the container 5 is equipped with an inlet 11 for a pressurized fluid and a compressor 9 is connected to the inlet 11 through a valve 10. An opening 23 is formed in the rear wall of the pressure container 5 and a sealing device 24 is placed inside the opening 23. The front end of the pressure container 5 is connected to a pipe line 14 through a flange joint 18 and an optional induction pipe (not shown) which is usually a curved pipe having the same diameter as that of the pipe line to adapt the front end of the pressure container to the pipe line constructed at a different height, e.g. under the ground. As the front end of the lining material 1, introduced in flattened state, is evaginated and annularly fixed to the mouth piece 8, the internal fluid pressure acts on the unevaginated portion of the lining material in rear of the fixed portion 12 to form a turning point 13 where the lining material is turned inside out. When the internal pressure is raised, the lining material 1 is pushed forward within the pipe line 14 whereby the turning point 13 advances correspondingly. The lining material is then applied simultaneously with evagination onto the inner surface of the pipe line 14 and bonded firmly thereto by the aid of the binder interposed between the lining material and the pipe line 14. As the binder 6 is applied sufficiently and evenly onto the inner surface of the lining material by the action of the sealing device 24, the lining material can satisfactorily be applied onto the inner surface of the pipe line 14 without formation of any space between them due to shortage of the binder. In addition to control of the amount of the binder applied, the sealing device serves to prevent leakage of the pressurized fluid from the opening 23.

In FIG. 3B showing another example of the apparatus of this invention wherein a binder is applied to the lining material just before introduction into the pressure container, the structure of the apparatus is similar to the same type of the prior art apparatus shown in FIG. 1 except that a specific sealing device in place of the slit is mounted to the pressure container in the apparatus of this invention. Accordingly, the reference numerals 1-18 in FIG. 3B have the same meanings as given in FIG. 1 and the lining treatment is carried out basically in the same manner as in FIG. 1. As the binder is not originally applied to the lining material 1, the structure of the driving unit 3 has no relation with the "push-back" problem of the binder and thus a pair of rolls driven by a motor 16 may be used as the driving unit 3. If desired, the driving unit 3' as shown in FIG. 3A may be used in place of the unit 3. In this case, the unit 3' is located, as shown in FIG. 3A, in front of the sealing device 24. In contrast, the driving unit 3 which strongly squeezes the lining material 1 between the rolls cannot be used for the apparatus shown in FIG. 3A wherein the lining material originally enclosed with a binder is used. In the apparatus shown in FIG. 3B, a shelf supporting a resin reservoir 7 is mounted to the rear wall of the pressure container 5. However, the resin reservoir may be formed apart from the pressure container and placed on a support separate from the container. In this case, the area of an opening 23 may be somewhat narrower so that an excess of the binder is squeezed on passing through the opening which functions as a big size slit. If desired, an induction pipe (not shown) may be interposed between the pipe line 14 and the front end of the pressure container 5 to adapt the front end of the pressure container to the pipe line constructed at a different height. In this case, the induction pipe should have the same diameter as that of the pipe line.

Figure 4B:
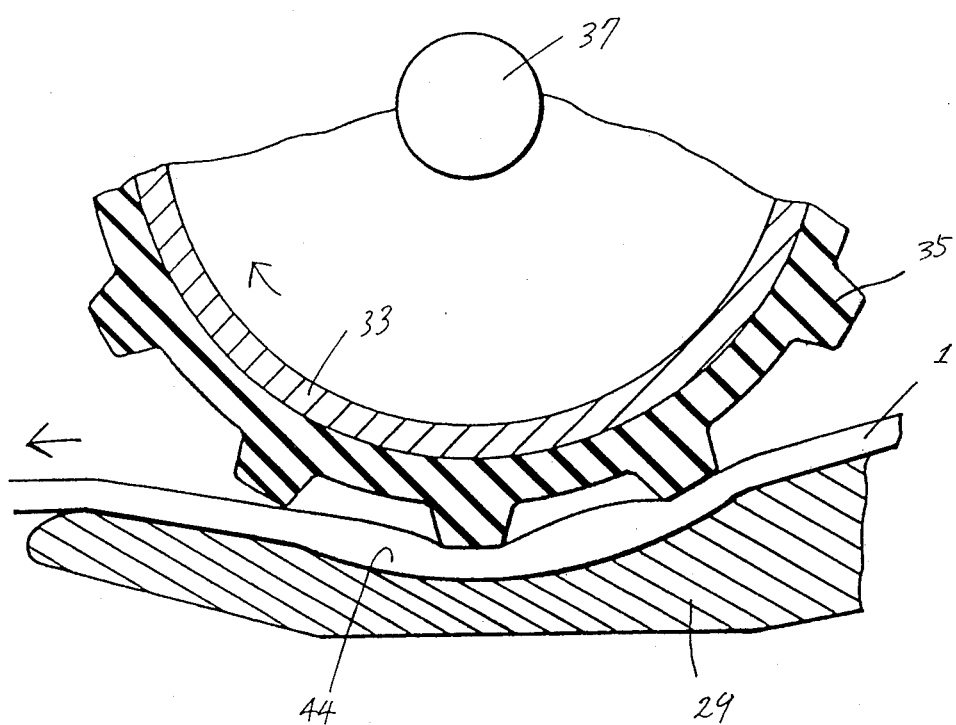
FIG. 4B is an enlarged partial section view of the sealing device of the same type as in FIG. 4A, showing the actual state of the lining material squeezed with projections formed on the outer surface of a rotary drum in transverse direction to the forwardly moving lining material.
Figure 5:
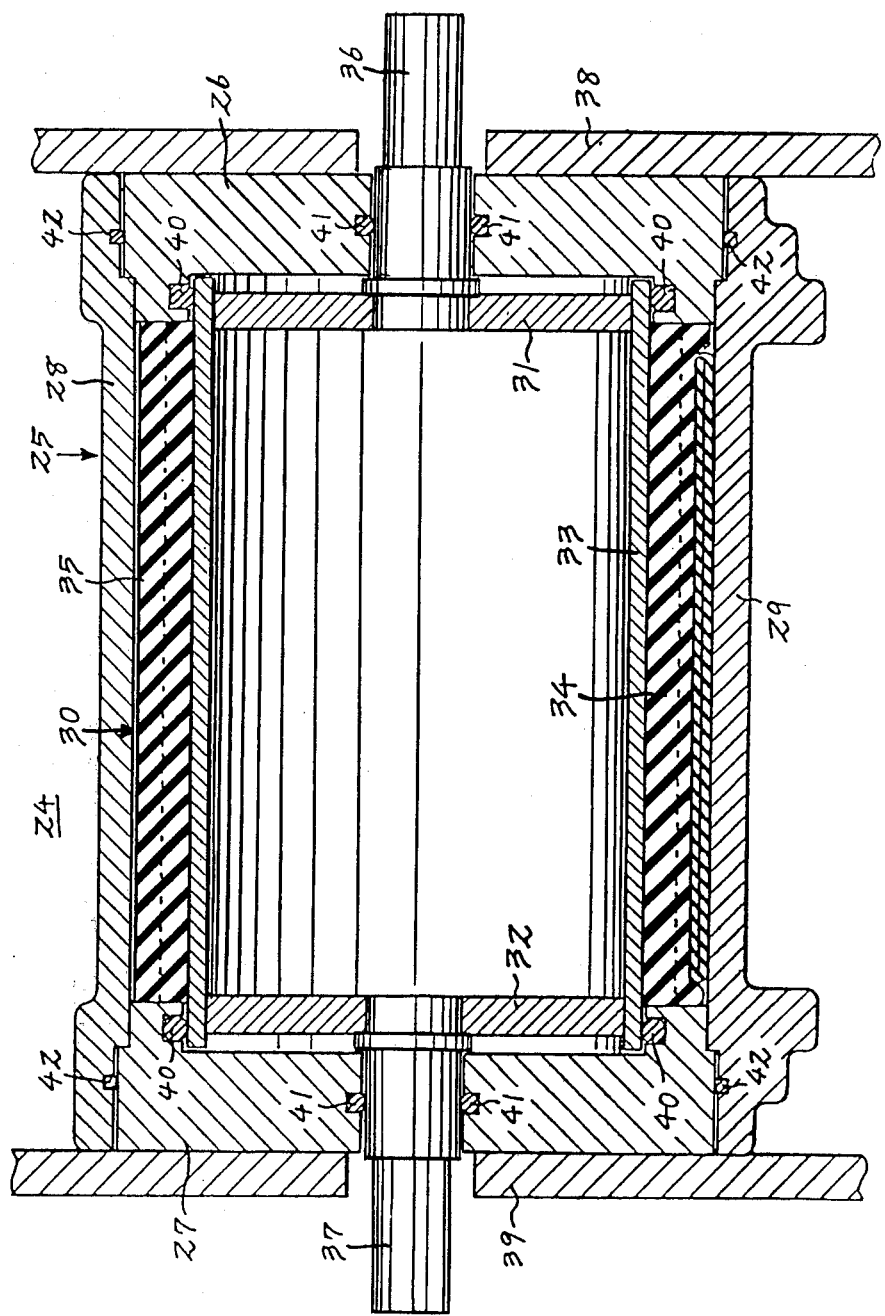
FIG. 5 is a central section view of the sealing device shown in FIG. 4A cut along the line V—V'.

In FIGS. 4A, 4B and 5 showing an example of the sealing device 24, a casing 25 comprises a pair of side plates 26 and 27, a semi-cylindrical sealing member 28 and a support 29 and mounted integrally to the rear wall 45 and side walls 38 and 39 of the pressure container 5. A rotary drum 30 comprises a cylinder 33 closed on both ends with lid panels 31 and 32 and overlaid on its periphery with an elastic cylinder 34 made of rubber or a flexible plastic substance. A number of projections 35 are formed integrally on the outer periphery of the cylinder 34 at intervals, each being shaped so as to form an elongated tooth linearly extending in parallel to the rotation axis and in the direction transverse to the advancing lining material 1. Shafts 36 and 37 are fixed at both ends of the rotary drum 30 and supported by both side plates 26 and 27 of the casing 25. The terminal ends of the shafts extend outward from the side walls 38 and 39 of the pressure container 5. The rotary drum 30, the side plates 26 and 27 and the shafts 36 and 37 are provided with O-rings 40, 41 and 42. The sealing member 28 is generally semi-cylindrical in compliance with a cylinder formed as a locus of the rotation of the outer periphery of the projections 35 around the shafts 36 and 37 and is inwardly protuberant in the front portion 43 so that the sealing member 28 may be brought into close contact in the portion 43 with the outer end of each projection 35. The protuberant portion 43 is formed over the distance greater than the pitch of the projections 35, i.e. the intervals of the individual projections, so that when the rotary drum 30 is rotated, at least one projection 35 may be brought into close contact with the sealing member 28 to maintain air-tightness in front or rear of the contacting projection. If the area of the protuberant portion 43 is too broad, the portion is brought at a time into close contact with many projections 35 whereby significant friction is formed. Thus, the area of the protuberant portion 43 is suitably selected so that only one or two projections 35 are brought into close contact with the portion 43.

The support 29 is so shaped that the upper supporting surface 44 is somewhat recessed to form an arc in cross section in close compliance with a cylinder formed as a locus of the rotation of the outer periphery of the projections 35 around the shafts 36 and 37. The supporting surface 44 may not directly be contacted with the outer end of the projections 35 but the clearance between the supporting surface 44 and the outer end of the projections 35 are preferably as small as possible. The length of the supporting surface 44 should be long enough to cover the distance greater than two times of the pitch of the projections 35 so that at least two projections 35 are present at all times on the supporting surface 44.

In FIG. 4B showing the actual state of the lining material 1 passing through the sealing device 24, the lining material 1 drawn from the reel is allowed to pass through the clearance between the rotary drum 30 and the support 29. As the lining material has been charged in its interior space with a binder at least before entrance into the sealing device 24, the lining material 1 is somewhat inflated with the enclosed binder, even if it is flattened. On the other hand, the clearance between the rotary drum 30 and the support 29 is almost identical with or somewhat smaller than an average thickness of the lining material in flattened state carrying no binder. The projections 35 on the rotary drum 30 are made of an elastic material and move in accordance with the rotation (in clockwise direction in the figure) of the rotary drum 30 without being closely contacted with the supporting surface 44 to form the above mentioned specifically defined clearance between the drum 30 and the support 29. When the lining material enclosing the binder is passed through the sealing device 24, the lining material is pressed between the rotating drum and the support surface with at least two projections 35 extending laterally and formed integrally with the elastic cylinder applied onto the outer periphery of the cylinder 33, whereby the lining material is pressed at intervals in at least two positions where the projections 35 are contacted with the lining material, in such manner that the lining material is squeezed in the lateral direction with the elastic projections 35 at intervals between which a definite amount of the binder is isolated. As the projections 35 are made of an elastic material, they are somewhat deformed on pressing the inflated lining material and move in the advancing direction of the lining material in accordance with the rotation of the drum around the shafts 36 and 37 while permitting concurrent advance of the lining material squeezed in at least two positions with the projections.

Thus, the lining material 1 in flattened state slightly inflated with the enclosed binder is squeezed in at least two positions with projections 35 whereby a continuous stream of the binder in the interior space of the lining material is interrupted at the squeezed positions between which a definite amount of the binder is siolated from the stream of the binder and conveyed forward with the rotation of the rotary drum 30 without being pushed backward by the internal fluid pressure.

Turning to FIGS. 4A and 5 schematically showing the mechanism of the sealing device 24, the elastic projections 35 are arranged normally at definite intervals on the cylinder 34. As the rotary drum is rotated by the advance movement of the lining material, a definite amount of the binder is positively conveyed at every passing of the projection 35. In addition to at least two projections tightly pressing the lining material passing through the clearance between the drum 30 and the support 29, at least one projection is always brought into close contact with the protuberant portion 43 of the sealing member 28 and both sides of the elastic cylinder 34 is at all times brought into close contact with the side plates 26 and 27 of the casing 25. Thus, the pressure container 5 is entirely confined with these elements and there is no fear of leakage of the pressurized fluid from the container. In a strict sense, a trace of the pressurized fluid is lost at every passing of the projection through the protuberant portion 43 of the sealing member 24. The term "sealing" or "anti-tightness" used herein does not mean perfect air-tightness permitting no leakage of fluid but means maintenance of a desired degree of fluid pressure in the pressure container 5. The sealing member 24 is to be understood as having air-tightness of such meaning.

The method of the present invention can be carried out in the following manner, for example, by using the apparatus shown in FIG. 3A or 3B: A tubular textile jacket as lining material 1 is connected at its one open end to a rope-like elongated element 15 such as a rope itself and wound on a reel 2 as shown in the figure. The rope-like elongated element should have a length at least equal to that of the lining material 1. In case of using the apparatus shown in FIG. 3A, the lining material 1 has previously been charged in its interior space with a binder 6. The other open end (front end) of the lining material 1 is drawn from the reel 2 and introduced into a pressure container 5 through a driving unit 3 (only in case of using the apparatus shown in FIG. 3B) and an opening formed in the rear of the container 5. In case of using the apparatus shown in FIG. 3B, a binder 6 in an amount sufficient enough to apply to the material 1 over its full length is enclosed in the interior space of the material 1 in rear of the container 5 to form a binder reservoir 7. The lining material 1 is then passed through a sealing device 24 and a driving unit 3' (only in the case of using the apparatus shown in FIG. 3A) and the front end thereof is annularly fixed to a mouth piece 8. The driving unit 3 or 3' is then driven while introducing pressurized fluid from a compressor 9 into the pressure container 5 through a valve 10 and an inlet 11 whereby a pressurized fluid is acted on the unevaginated portion of the lining material in rear of the fixed portion 12 to form a turning point 13 where the lining material 1 is turned inside out. When the lining material 1 charged with the binder 6 is passed through the sealing device 24, the lining material to which a definite amount of the binder 6 is evenly applied can be introduced into the pressure container 5 by the action of a rotary drum 30 provided on its outer periphery with projections 35 at definite intervals without causing any push-back of the binder from the container 5. By driving the unit 3 or 3' under fluid pressure, the lining material 1 is pushed forward within a pipe line 14 to be treated whereby the turning point also advances within the pipe line 14. In this case, advance and evagination of the lining material are controlled at constant velocities by the action of the unit 3 or 3' and the lining material is evaginated and bonded onto the inner surface of the pipe line 14 over its full length. After completion of the lining treatment, the binder 6 is cured in an adequate manner and the both ends of the lining material extending from the both ends of the pipe line are suitably treated to finish the whole treatment.

The sealing device of this invention may be modified without altering its function as a means for positively conveying a definite amount of the binder to the pressure container while maintaining fluid pressure therein.

Figure 6:
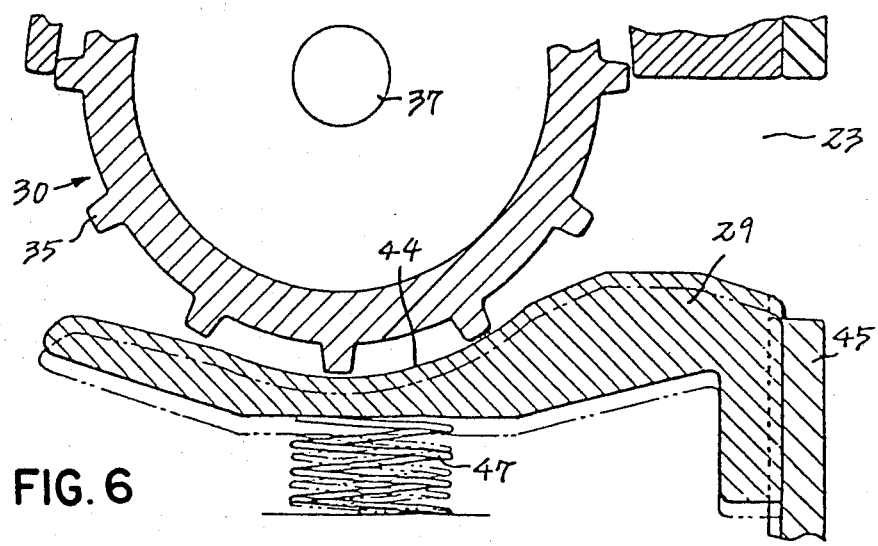
FIG. 6 is an enlarged partial section view of another example of the sealing device.

In FIG. 6 showing a main part of another example of the sealing device, a support 29 is equipped to the rear wall 45 of the pressure container 5 in such manner that the support 29 is vertically slidable on the wall 45 by means of a spring mechanism 47 so that the support may oscillate in the direction going away from a rotary drum 30. In case this sealing device is not in action, or in other words, the lining material is not passed therethrough, the support 29 is brought into close contact with the rotary drum 30 by means of the spring mechanism 47 so that there is no substantial clearance between the support 29 and projections 35 formed on the outer periphery of the rotary drum 30. When the lining material in a flattened state is inserted between the rotary drum 30 and the support 29, the support is pushed down for a distance corresponding to the thickness of the lining material so that the lining material is allowed to pass through the clearance formed between the support 29 and the rotary drum 30 and squeezed in at least two positions between the projections 35 formed on the outer periphery of the drum 30 and the upper supporting surface 44. Accordingly, almost similar technical advantages can be achieved by using this modified sealing device in place of the device shown in FIGS. 4A and 5. The actual state of the lining material squeezed with this modified device is as shown in FIG. 4B. This modified device is of course provided with the same sealing mechanism as shown in FIGS. 4A and 5 so as to prevent leakage of the pressurized fluid from the pressure container 5. The spring mechanism 47 may be an ordinary spiral spring as shown in FIG. 6. In this example, the outer peripheral portion and the projections 35 of the rotary drum 30 may not be made of an elastic material and may be constructed integrally with a metal or alloy. To maintain better air-tightness, however, at least the outer peripheral part of the projections 35 should preferably be made of an elastic material. A similar technical effect is obtained by fixing the support 29 to the rear wall 45 of the pressure container 5 and mounting the rotary drum 30 and the sealing member 28 integrally to the rear wall in such manner that the drum 30 and the member 28 may be oscillated vertically by means of a spring mechanism or self weight.

Figure 7:
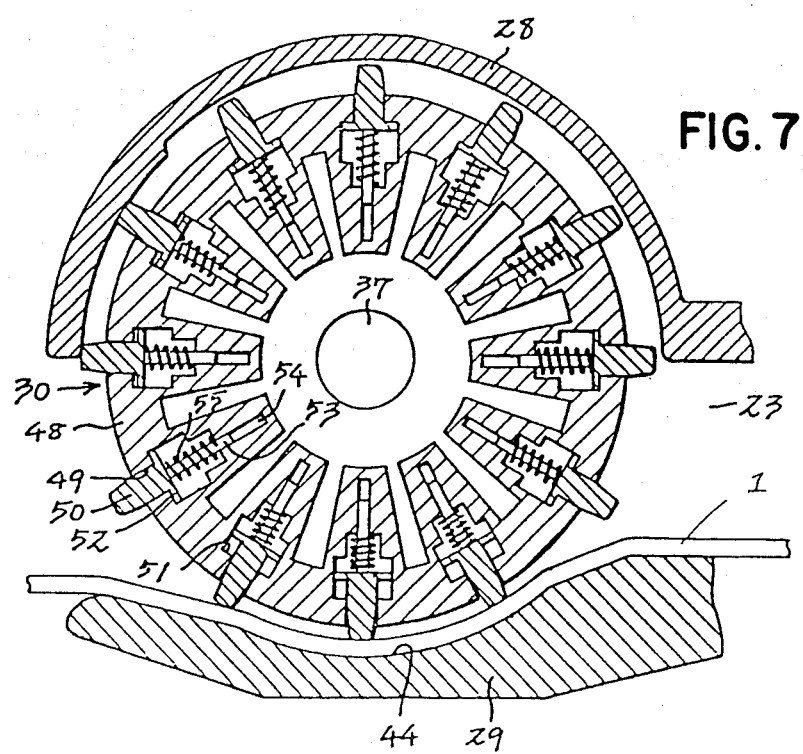
FIG. 7 is a sectional view of still another example of the sealing device.

In FIG. 7 showing still another example of the sealing device, projections 35 are mounted to the rotary drum 30 in such manner that they may be radially stretchable or shrinkable by means of a built-in spring mechanism 55. A number of laterally elongated slits 49 are formed radially on the outer periphery of a body 48 of the rotary drum 30. Panel-like elements 50 are inserted into the slits 49 in such manner that the front end of each panel-like element 50 extends outwardly from each slit 49. The bottom of each panel-like element 50 is provided with a stopper 52 which can be engaged with a step 51 of each slit 49 lest each panel-like element 50 should extend beyond the necessary length. One or more pins 53 are driven in the bottom of each panel-like element 50, which are slidably adapted to holes 54 formed in the bottom of each slit 49. A spiral spring 55 surrounding each pin 53 as a guide shaft is interposed between the bottom of each slit 49 and the bottom of each panel-like element 50 so that each panel-like element 50 is energized to extend from each slit 49 at all times.

When the lining material in a flattened state is inserted between the support 29 and the rotary drum 30 in this example, the panel-like element 50 in contact with the lining material is pushed inward into the slit 49 for a distance corresponding to the thickness of the lining material 1, against the elastic tension of the spring 55 whereby the lining material 1 is squeezed between the panel-like element 50 pushed by the elastic tension of the spring 55 and the upper supporting surface 44. In this example, the panel-like elements 50 are so arranged that at least two of them are brought into close contact with the lining material on the upper supporting surface 44. The sealing member 28 in this example has the same structure and function as shown in FIGS. 4A and 5 so that any leakage of pressurized fluid is prevented and no fluid escapes from the opening 23. For attaining better air-tightness, at least the outer periphery of the panel-like elements 50 should preferably be made of an elastic material.

Figure 8:
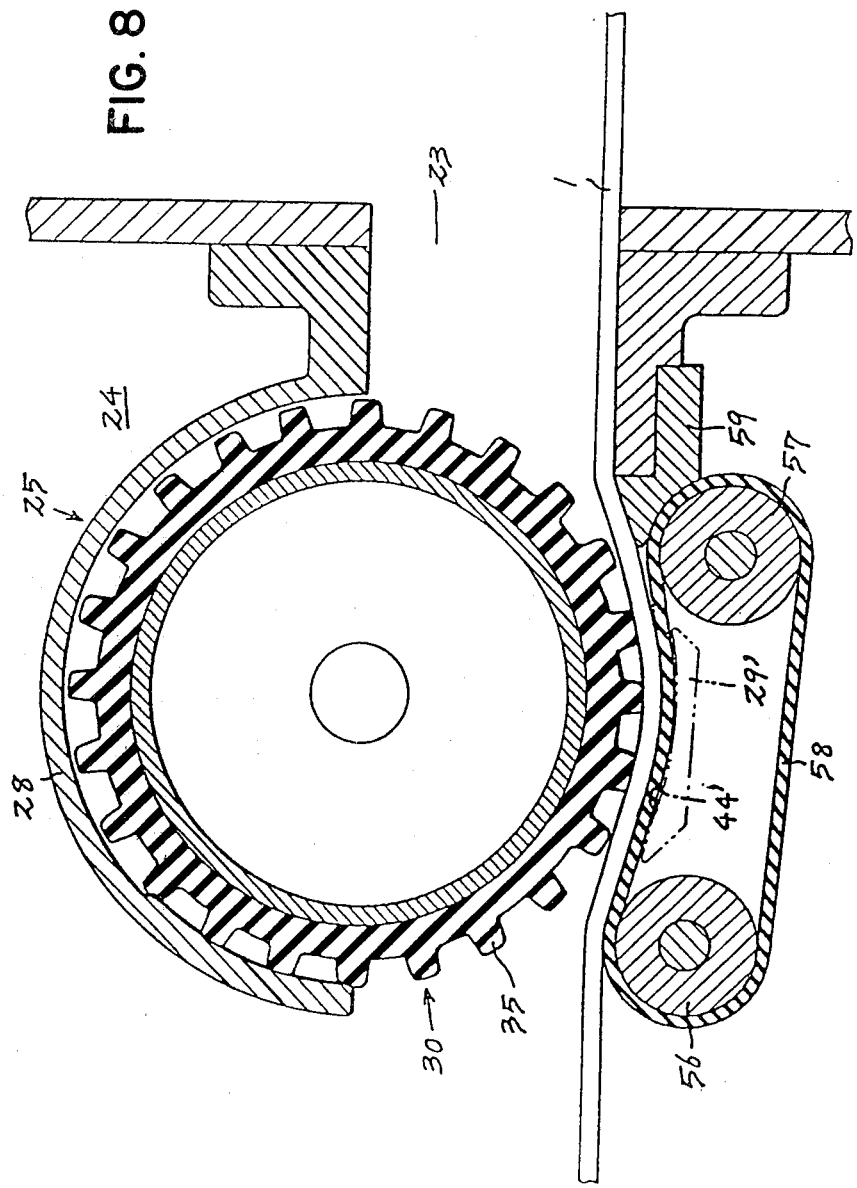
FIG. 8 is a sectional view of further example of the sealing device.

In FIG. 8 showing further example of the sealing device, an endless belt 58 is used in place of the support 29 in the preceding example. The endless belt 58 is put on a pair of freely rotatable pulleys 56 and 57 placed beneath the rotary drum 30 in such manner that the endless belt may be contacted with at least two projections 35. A lower sealing member 59 is mounted to the lower part of the opening 23 so that the member 59 may be contacted with the surface of the endless belt 58. When the lining material 1 in flattened state is inserted between the rotary drum 30 and the endless belt 58, the tensioned upper portion of the belt 58 is pushed down for a distance corresponding to the thickness of the lining material whereby the lining material 1 is allowed to pass between the drum 30 and the tensioned endless belt 58. On the other hand, the lining material 1 is squeezed in at least two positions between the projections 35 and the endless belt 58 whereby a definite amount of the enclosed binder is maintained in the portion between the squeezed portions. The rotary drum 30 and the endless belt 58 are rotated with the advance of the lining material 1 whereby the lining material is always squeezed between them at least in two positions. In this example, the force required for moving the lining material forward may be weakened as both the drum 30 and the belt 58 are rotated with the advancing lining material and no frictional resistance is produced. In this example, further modifications may be made, for example, by reversing the squeezing mechanism between the drum 30 and the belt 58 in such a manner that the rotating drum 30 may have a flat peripheral surface but the belt 38 may be provided on its outer surface with elastic projections 35. Both the drum 30 and the belt 58 may have projections 35 in the same pitch (interval) so that the projections formed on the drum 30 and on the belt 58 may be faced to each other and the lining material may be squeezed between the facing projections in at least two positions. The pitches of the facing projections on the drum 30 and the belt 58 may be different from each other so that the lining material is squeezed between the projections of either one and the flat periphery of the other. If the pitches of the projections formed on both the drum 30 and the belt 58 are different, the intervals between the adjacent projections should be long enough to make sure that the binder is involved in the portion of the lining material between the interlocking projections. When projections are formed on both the drum 30 and the belt 58, it is necessary to rotate these jointly.

In FIG. 8, a support 29' having a supporting surface 44' which is identical with the upper supporting surface 44 shown in FIG. 4A or 4B is placed in the lower part of the endless belt 58 facing to the drum 30. In the case of the sealing device 24 shown in FIG. 8, the space between the adjacent projections 35 on the lining material 1 is maintained under atmospheric pressure while the endless belt 58 below the lining material 1 is kept under a higher fluid pressure. Accordingly, the lining material in contact with the space between the adjacent projection 35 is slightly pushed up through the endless belt 58 whereby the amount of the binder to be contained in the lining material in contact with the space becomes smaller. The use of the support 29' having the supporting surface 44' as shown (by a chain line) in FIG. 8 prevents the direct action of the fluid pressure to the upper back side of the endless belt 58 whereby ascent of the endless belt toward the space between the adjacent projections is prevented and a sufficient amount of the binder can be enclosed in the portion of the lining material put between the adjacent two projections. As the use of the support 29' limits the descending movement of the upper endless belt 58 in contact with the drum 30, a certain device is necessary for allowing the lining material 1 to pass between the drum 30 and the endless belt 58. For example, the projections 35 can be made of an elastic material such as rubber or a elastic synthetic resin as in the example shown in FIG. 4A where the lining material 1 is allowed to pass through the device 24 by deformation of the projections when contacted with the lining material. Alternatively, the support 29' may be constructed as in the example shown in FIG. 6 wherein the support is mounted to the rear wall of the pressure container 5 slidably in the vertical direction with respect to the drum 30 by means of a spring mechanism equipped to the bottom of the support, or a modified example wherein the rotary drum 30 and the sealing member 28 may be oscillated vertically by means of a spring or self weight. Further modification may be made in the rotary drum 30 as in the example shown in FIG. 7 by providing the rotary drum 30 with radially stretchable or shrinkable projections 35 which are normally energized to extend from the outer periphery of the drum 30 by means of a spring mechanism. The sealing member 28 as the upper construction of the casing 25 may have the same structure as in the example shown in FIG. 4A or 5. Thus, the pressure container 5 is kept air-tight and no leakage of pressurized fluid from the opening 23 is warranted.

Figure 9:
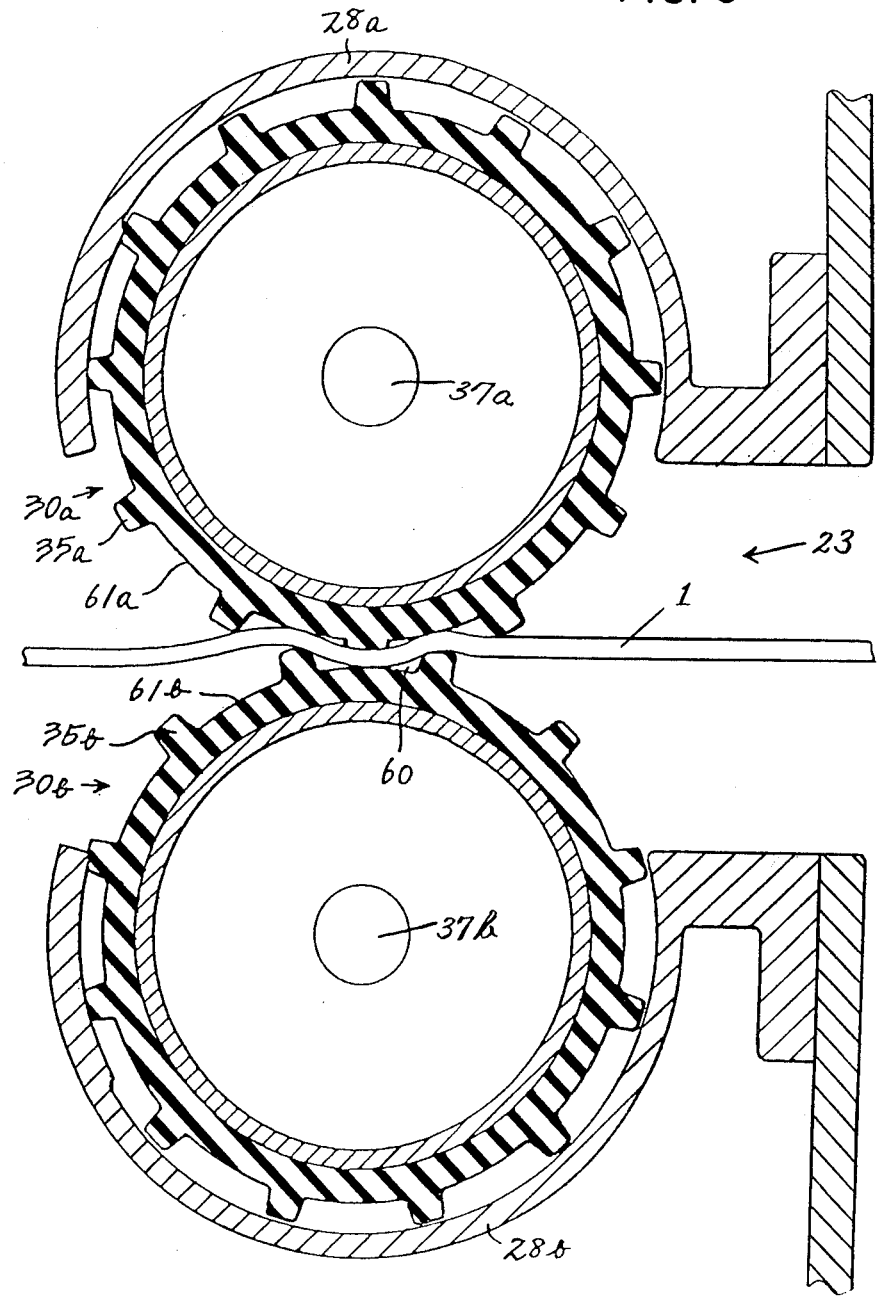
FIG. 9 is a sectional view of still further example of the sealing device.

In FIG. 9 showing still further example of the sealing device 24, a casing consists of a pair of sealing members 28a and 28b and a pair of rotary drum 30a and 30b having rotation shafts 37a and 37b and projections 35a and 35b arranged symmetrically to the central horizontal axis with respect to an opening 23. The central horizontal axis constitutes a path of the lining material 1 entering in this sealing device. The rotary drums 30a and 30b provided on their outer peripheries with projections 35a and 35b at definite intervals are arranged in such a manner that the drums 30a and 30b are jointly rotated with the projections 35a being interlocked with the projections 35b. The projections 35a and 35b are made of an elastic material and a clearance 60 is formed between the projections 35a and 35b in interlocked condition. The sealing members 28a and 28b have the same structure and function as in the example shown in FIGS. 4A and 5. As the projections 35a and 35b are arranged at sufficient intervals on the outer periphery of the drum 30a and 30b, valleys 61a and 61b existing between the adjacent projections are so broad that sufficient spaces remain in the valleys 61a and 61b even if the projections 35a and 35b are interlocked with each other. When the lining material 1 is inserted into the clearance between the drums 30a and 30b, the material 1 is squeezed in at least two positions between the valleys and the projections when both drums are interlocked. When the lining material 1 is moved forward in such condition, the drums are jointly rotated while squeezing the material 1 in at least two positions whereby the pressurized fluid in the pressure container is sealed at the squeezed position and the binder enclosed in the lining material is conveyed to the pressure container together with the material without being pushed back by the fluid pressure. A modification may be made in this example, on the basis of the same technical concept as in the example shown in FIG. 6, by constructing the rotary drums 30a and 30b and the sealing members 28a and 28b in such manner that a combination of the drum 30a and the member 28a and a combination of the drum 30b and the member 28b may be oscillated in the direction that both combinations go away from each other. Further modification may be made in this example by changing the projections 35a and 35b on the drums 30a and 30b to those radially stretchable and shrinkable as in the example shown in FIG. 7.

In the sealing devices shown in FIGS. 4A, 6, 7, 8 and 9, the rotary drum or drums and the incidental endless belt are rotated by the lining material moved forward by the action of the driving unit 3 or 3'. However, the rotary drum or drums may positively be rotated externally, for example, by jointly driving the rotary drum with the driving unit by means of a series of gears or chains preferably adjusted to obtain the same peripheral speed. If the rotary drum is positively driven, the driving unit 3 or 3' may be omitted. In this case, the rotary drum functions also as a driving unit.

Although the apparatus of this invention, especially the sealing device, may be modified in various ways as shown in FIGS. 3A, 3B, 4A and 6-9, various modifications may be made also in the method of this invention and the materials used therein. For example, a rope-like elongated element is previously passed through the lining material over its full length and drawn from the opposite end of the pipe line while applying fluid pressure to the lining material in rear of the annularly fixed portion in a usual manner whereby the unevaginated portion of the lining material is allowed to advance within the pipe line and evaginated at the turning point and at the same time the evaginated lining material is attached onto the inner surface of the pipe line under pressure of the pressurized fluid. According to this modification, the fluid pressure may be so weak that the already evaginated portion of the lining material may be attached under pressure onto the inner surface of the pipe line. This modification is particularly suitable for lining pipe lines having a number of curved portions.

A preferable lining material used in the present invention is a flexible tubular textile jacket having the structure as shown in FIG. 2. The lining material of this type is usually utilizable as hose and is commercially available. The lining material shown in FIG. 2 has an airtight layer on its outer surface which, after evagination, becomes the innermost layer of the lining material applied to pipe lines. As the innermost layer of the lining material is brought into direct contact with the fluid passing through the pipe line, this layer should be excellent in not only inherent gas-impermeability but also various resisting properties such as water-resistance, weather-resistance, ozone-resistance, oil-resistance, chemicals-resistance, heat-resistance and cold-resistance and should possess satisfactory toughness and flexibility. In these aspects, a polyester elastomer which is further excellent in abrasion-resistance, tensile strength and tear strength and exhibits good adhesion to synthetic fibers of polyester series is used for manufacturing the tubular textile jacket. This elastomer is commercially available under the registered trademarks "Pelprene" (Toyobo, Japan) and "Hytrel" (DuPont, U.S.A.). Fibers of polyester series are suitable, especially as warp, for manufacturing the tubular textile jacket. However, other natural and/or synthetic fibers such as cotton, hemp, rayon and polyamide fibers incorporated with or without glass fibers, carbonaceous fibers and the like inorganic fibers can also be used in place of polyester fibers.

The binder attains bonding of the lining material to pipe lines over broad areas. Accordingly, such type of binders as containing a volatile ingredient or having a very shortened pot life cannot be used for the present invention. A thermocurable binder of epoxy series is particularly suitable for the present invention. In the embodiment shown in FIG. 3A wherein the binder has previously been applied onto the inner surface of the lining material, the use of a binder having an extended pot life is preferable since it takes usually a somewhat longer time until completion of the lining treatment. The embodiment shown in FIG. 3B wherein a binder reservoir is placed in rear of the sealing device is advantageous in that the previous application of the binder onto the inner surface of the lining material is unnecessary and thus the working efficiency is higher than the embodiment shown in FIG. 3A. In the embodiment shown in FIG. 3B, however, it takes a longer time to consume all of the binder in the reservoir. Thus, the use of a binder having an extended pot life or a binder of lower exotherm on curing is preferable in this embodiment.

In case of underground pipe lines, the so-called earthquakeproof property is recently required for lined pipe lines to prevent any secondary disaster resulting from leakage of a large amount of water or an inflammable liquid or gas from the pipe lines damaged by strong earthquake shock. To satisfy this requirement, the lining material alone must withstand a fluid maintained under high pressure because joint portions of pipe lines are often disjointed or damaged and pipe lines themselves are in certain cases broken or cracked by strong earthquake shock. The use of such lining material as having a tensile strength in longitudinal direction of at least 1000 kg/cm width and an elongation on fracture of at least 10% and bonding of this lining material to the inner surface of pipe lines at such cohesive strength that the lining material may be detached at a shearing load of 1-6 kg/cm$^2$ is found to be satisfactory for the above requirement. Even if pipe lines themselves are broken or disjointed in the joint portion by earthquake or the like strong mechanical shock, the lining material itself around the damaged portions is detached from the inner surface of the pipe line and maintains for a while the function as a pipe line. In view of the foregoing, it is desirable that a lining material having an air-tight layer 19 of a polyester elastomer is evaginated and bonded onto the inner surface of the pipe line with a thermocurable binder 6 of epoxy series. In such lining material, the tubular textile jacket is impregnated with the binder and the whole is integrally bonded to form a rigid pipe like FRP pipe. Even if the pipe line itself is damaged, the lining material alone still maintains the function as a pipe line.

Various types of driving units can be used for the apparatus of the present invention. In the example shown in FIG. 3A, the use of a twin catarpillar system is preferable and is placed in front of the sealing device, considering the situation that frictional resistance on passing the lining material through the sealing device 24 is relatively high. The frictional resistance in the sealing device can be absorbed in the power for driving the unit 3' so that the force required for evagination of the lining material can simultaneously be weakened. A driving unit of such structure as shown in FIG. 3A wherein the flattened lining material is conveyed forward in linear state by slightly being pressed between the facing protuberances without being squeezed between the rolls is preferable for the present invention.

A variety of modifications may be made, as shown in FIGS. 6, 7, 8 and 9, in the structure of the sealing device 24. Especially important is, however, to vary the amount of the binder applied to the inner surface of the lining material by altering the pitch and hardness of the projections. If the pitch of the projections becomes greater, a larger amount of the binder can be held correspondingly in a portion of the lining material isolated in the space formed between the adjacent projections, thus resulting in increment of the amount of binder enclosed in the lining material. The use of a harder material for projections enables stronger squeezing of the lining material with the projections so that the amount of the binder held in the portion isolated between the adjacent squeezing projections becomes larger. However, the use of hard projections tends to reduce air-tightness of the sealing device and cause fluctuation in thickness of the lining material and difficulty in passing the lining material through the sealing device 24 when the lining material is enclosed with a foreign material. The hardness of the projections 35 is to be determined, taking the structure of the sealing device into consideration.

In the present invention characterized by using a specific sealing device 24, it is of a particular advantage that a definite amount of the binder enclosed evenly or unevenly in the lining material be positively conveyed portionwise to the pressure container without permitting any push-back of the binder on entrance into the pressure container. Thus, the inner surface of the pipe lines can be provided with a lining material through a sufficient amount of the binder. Additional advantages of the present invention are that the sealing device is simple in mechanism and structure and small in size and can thus be provided at low cost.

It is also a merit of the present invention that the lining treatment can be carried out for underground pipe lines having a length as long as 100 meters or more and/or many curved portions without any particular attention being paid to the operation conditions.

As many apparently widely different embodiments of this invention may be made without departing from the spirit and scope thereof, it is to be construed that this invention is not limited to the specific embodiments thereof except as defined in the appended claims.

What is claimed is:

1. A method for providing the inner surface of a pipe line with a tubular lining material through a binder under fluid pressure which comprises the steps of introducing said tubular lining material in a flattened state having a binder enclosed in the interior space thereof and coated on the inner surface thereof from an environment of atmosphere pressure into a pressure container from a rear end portion thereof, annularly fixing one lead end of said tubular lining material in an evaginated state to a front end portion of said pressure container, applying fluid pressure to the pressure container for internally pushing the portion of the tubular lining material in rear of said annularly fixed position to form a turning point where the tubular lining material is turned inside out, allowing the turning point to advance within said pipe line while bonding the evaginated tubular lining material onto the inner surface of said pipe line with said binder being interposed therebetween under said fluid pressure, characterized in that the step of introducing said tubular lining material into said pressure container is accompanied by squeezing said flattened tubular lining material by a sealing device in at least two adjacent squeezed positions linearly in a transverse direction to said advancing tubular lining material so as to isolate a portion of said tubular lining material together with said binder between said adjacent linearly squeezed positions, allowing said tubular lining material to advance into said pressure container while keeping said tubular lining material squeezed linearly in said transverse direction at said positions and subsequently releasing said tubular lining material from said sealing device into said pressure container under fluid pressure.

2. An apparatus for providing the inner surface of a pipe line with a tubular lining material through a binder under fluid pressure, which comprises (1) a pressure container, provided in the rear end portion with an opening for the introduction of a tubular lining material, in the front end portion with a mouth piece for annularly fixing said tubular lining material thereto and in any suitable position with an inlet for pressurizing fluid, (2) a driving unit for pushing said tubular lining material forward through said pressure container, (3) a sealing device positioned in said rear end opening, which comprises (a) an externally rotatable rotary drum which rotates jointly with said driving unit placed in such a manner that said drum rotates on the path of said tubular lining material, said drum being provided on the outer peripheral surface thereof with a plurality of projections extending transversely parallel to the rotational axis of said drum at definite intervals, (b) a sealing member positioned above said rotary drum and in close contact with said projections to secure air-tightness, and (c) a squeezing base positioned beneath said rotary drum to support said tubular lining material thereon, with the curvature of both of said sealing member and squeezing base being concentric with said rotary drum, in such a manner that said tubular lining material interposed between said rotary drum and said squeezing base may be squeezed in an air-tight manner in at least two adjacent positions at all times at said definite intervals with said projections and a means for rotating said rotary drum jointly with the movement of said driving unit.

3. An apparatus according to claim 2, wherein the whole or a tip portion of the projections are made of an elastic material.

4. An apparatus according to claim 3, wherein said projections are mounted to the rotary drum in such manner that they may be radially stretchable or shrinkable by a built-in spring mechanism.

5. An apparatus according to claim 2, wherein said squeezing base is a support having an upper supporting surface recessed to form an arc in close contact with said projections of said rotary drum.

6. An apparatus according to claim 5 further including a spring mechanism for oscillating either of said support and a combination of said rotary drum and said sealing member in a direction away from each other but which is at all times energized to the other.

7. An apparatus according to claim 2, wherein said squeezing base is an endless belt comprising upper and lower caterpillar portions mounted on a pair of freely rotatable pulleys in such a manner that said endless belt may be contacted air-tightly with at least two projections of said rotary drum.

8. An apparatus according to claim 7, wherein a support having a support surface recessed to form an arc in compliance with the locus of the projections on said rotary drum is positioned below said upper caterpillar of said endless belt.

9. An apparatus according to claim 8, further including a spring mechanism for oscillating said support in a direction away from said rotary drum but is at all times energized to said rotary drum and said upper caterpillar portion of said endless belt is also at all times in contact with said support in compliance with said oscillation.

10. An apparatus according to claim 7, wherein said means for rotating said rotary drum jointly with the movement of said driving unit comprises a gear mechanism which also jointly rotates said pulleys, all at the same periphery speed.

11. An apparatus according to claim 7, wherein said projections on the outer periphery of said rotary drum are eliminated but said endless belt has a plural number of projections on the outer peripery thereof in such a manner that said tubular lining material is squeezed in at least two positions between said rotary drum and said endless belt.

12. An apparatus according to claim 7 wherein both said rotary drum and said endless belt have plural projections on said respective outer peripheries at the same pitch so that said projections formed on said rotary drum and on said endless belt may be faced to each other and said tubular lining material may be squeezed between the facing projections in at least two positions.

13. An apparatus according to claim 7, wherein both said rotary drum and said endless belt have projections at a different pitch whereby the interval between adjacent projections is long enough and said tubular lining material is squeezed between said projections of either one and the flat periphery of the other.

14. An apparatus according to claim 2, wherein said projections are mounted to said rotary drum in such manner that they may be radially stretchable or shrinkable by means of a built-in spring mechanism.

15. An apparatus according to claim 2, wherein said squeezing base comprises a second rotary drum having plural projections in combination with a second sealing member and said tubular lining material is squeezed between said resulting pair of two rotary drums in such a manner that said tubular lining material is squeezed in at least two positions between valleys in either one of said rotary drums and the projections of the other of said rotary drums when both of said drums are interlocked.

16. An apparatus according to claim 15, wherein said projections are mounted to either or both of said rotary drums in such manner that said projections are radially stretchable or shrinkable by a built-in spring mechanism.

17. An apparatus according to claim 15, further including a spring mechanism for oscillating either of said rotary drums together with said incidental sealing members in the direction away one from the other but being at all times energized one to the other.

* * * * *